No. 643,903. Patented Feb. 20, 1900.
J. LANE.
FENCE MACHINE.
(Application filed Sept. 13, 1898.)
(No Model.) 3 Sheets—Sheet 2.
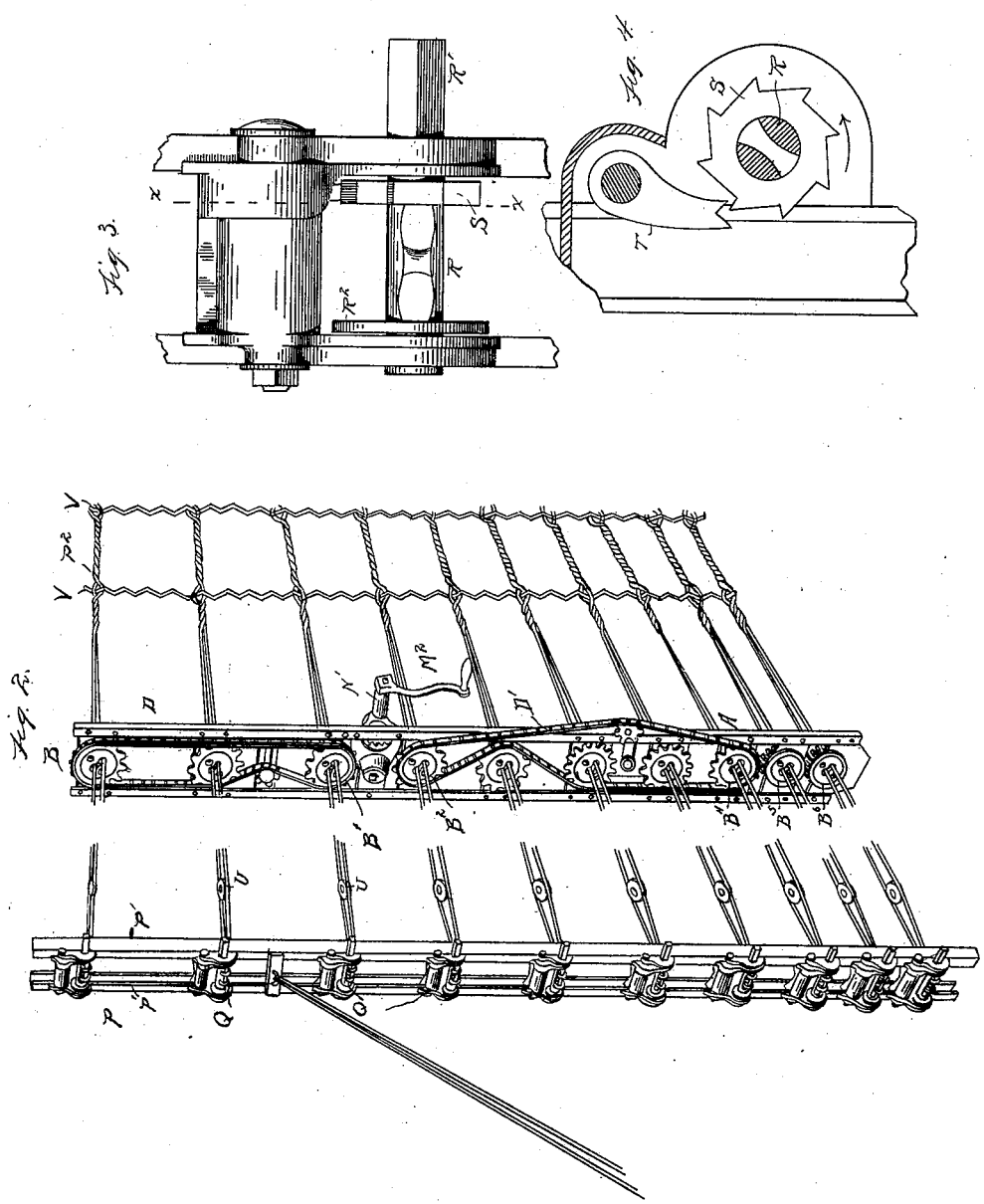
WITNESSES
INVENTOR
John Lane
By Parker & Burton
Attorneys.

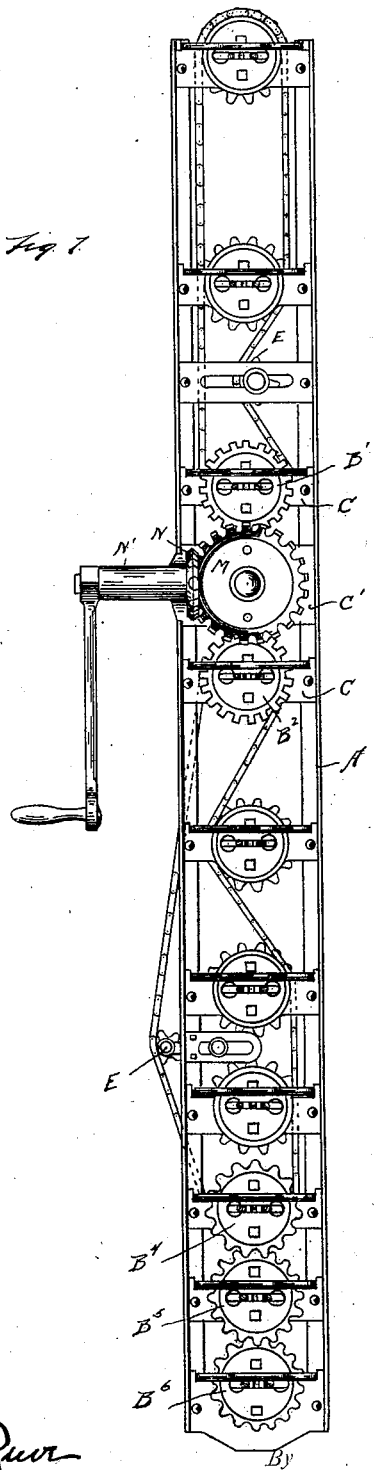

No. 643,903. Patented Feb. 20, 1900.
J. LANE.
FENCE MACHINE.
(Application filed Sept. 13, 1898.)
(No Model.) 3 Sheets—Sheet 3.
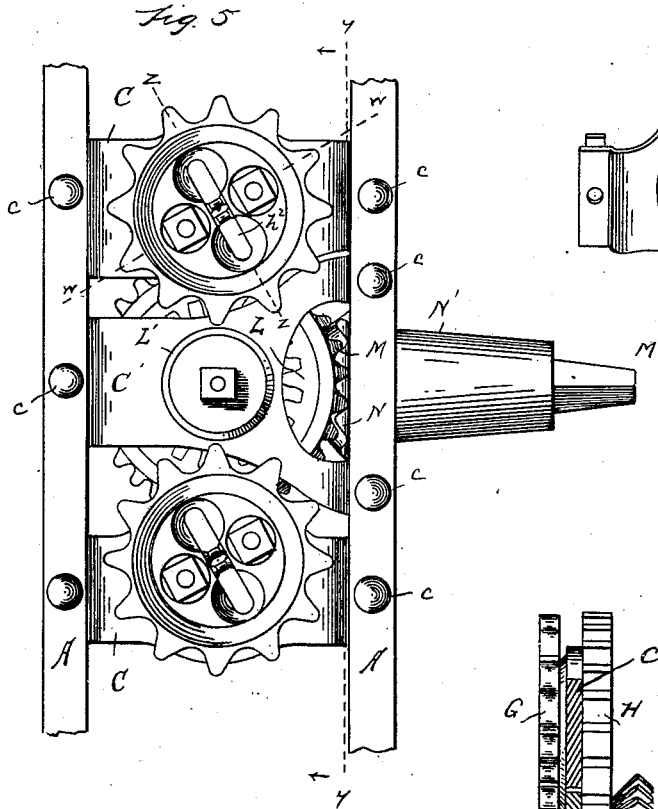
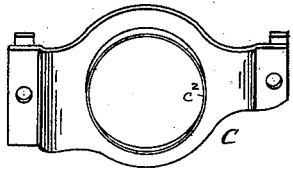
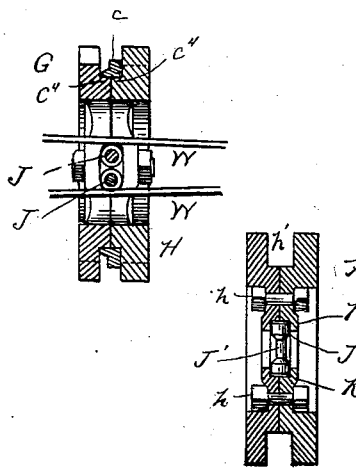
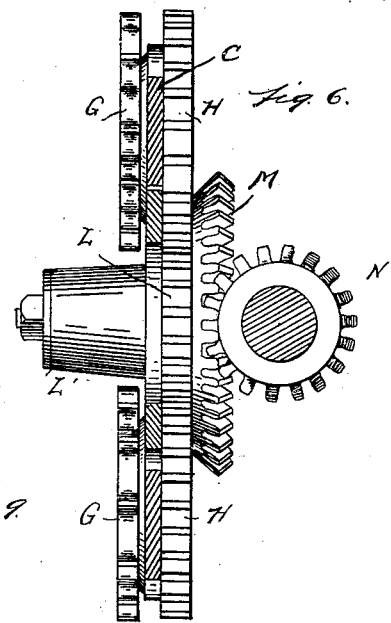
WITNESSES
INVENTOR
John Lane
By Parker & Burton
Attorneys.

UNITED STATES PATENT OFFICE.

JOHN LANE, OF HOLLY, MICHIGAN.

FENCE-MACHINE.

SPECIFICATION forming part of Letters Patent No. 643,903, dated February 20, 1900.

Application filed September 13, 1898. Serial No. 690,853. (No model.)

*To all whom it may concern:*

Be it known that I, JOHN LANE, a citizen of the United States, residing at Holly, county of Oakland, State of Michigan, have invented a certain new and useful Improvement in Fence-Machines; and I declare the following to be a full, clear, and exact description of the invention, such as will enable others skilled in the art to which it pertains to make and use the same, reference being had to the accompanying drawings, which form a part of this specification.

My invention relates to fence-weaving machines, and more particularly those which are removable and employed to weave fence in place in fields.

It consists in the various combinations hereinafter described and claimed.

In the drawings, Figure 1 is a rear elevation of the machine shown in Fig. 2, showing the opposite face thereof from that shown in Fig. 2. Fig. 2 is a perspective view in elevation of the machine as used in the actual operation of manufacturing fence. Fig. 3 is a front view of the tightener. Fig. 4 is a sectional view on the line $x\,x$ thereof. Fig. 5 is an enlarged view of the driving mechanism for the twisters, including two twisters. Fig. 6 is a sectional view of the same on the line $y\,y$. Fig. 7 is a view of the bracket-bearing detached for the twisters. Fig. 8 is a sectional view on the line $z\,z$, Fig. 5. Fig. 9 is a section on the line $w\,w$ of Fig. 5.

In the drawings, A represents the frame, usually made of angle-iron, within which the twisters B B are held on brackets or cross-bars C (represented in Fig. 7) and adjustably attached to the framework A by small bolts $c\,c$, as shown in Fig. 5. The twister-wheels B B are also sprocket-wheels and are driven by a sprocket-chain D, which is also driven by another twister-wheel B'. This in turn is driven by a peculiarly-arranged gear, more particularly illustrated in Figs. 5, 6, 7, 8, and 9, and hereinafter described. Another twister-wheel $B^2$ drives the lower twister-wheels $B^3\,B^3\,B^4$ by means of the sprocket-chain D'.

The driving of twister-wheels in mechanisms of this kind for the purpose of manufacturing woven-wire fence in the field by a driving or sprocket chain is a very common matter; but heretofore all of the wheels have been driven by one driving-chain operated from a central wheel (which is also used as a twister) and by means of gearing and a crank directly connected to or working with this central wheel. Thus the force exerted upon all of the wires in twisting is thrown upon a single chain, and as the chain cannot be tight the result is that there is more or less lost motion, which increases especially in proportion as the twister-wheels are further from the central driving-wheel. As the twisting is reversed after the introduction of each picket, as shown at $P^2$, those wheels which are most remote from the driving-wheel, in consequence of the lost motion, lag behind the driving-wheel, with the result that the top and bottom strands are not twisted to the same extent as the central ones, and therefore the top and bottom strands do not as tightly grasp the pickets as the central strands which are twisted by twister-wheels nearer the driving-wheel. By using two driving-chains, and thereby reducing the number of wheels driven by each chain, I attain much more positive and uniform results than those heretofore secured.

E E are idler-wheels which are on bearings adjusted in slots with appropriate means for fixing them in position, their office being to take up the slack of the sprocket-chain as far as is reasonably possible. As, however, there is nothing new in these devices a detailed description of them is omitted.

Referring to Fig. 1, it will be noted that the lower wheel $B^4$, driven by the sprocket-chain, carries a spur-gearing, which drives a twister-wheel $B^5$, which in turn drives another twister-wheel $B^6$ by means of a spur-gearing. These lower wheels $B^4$, $B^5$, and $B^6$ are for the purpose of constructing the lower strands of the fence, and as these are placed very closely together that portion of the fence is substantially proof against the passage of small animals, it being obvious that if such strands are not necessary in the fence for that purpose the wires may be omitted, thus omitting the strands, and the wheels would then be inoperative during the process of weaving fence. As the sprocket-chain and the wheels driven thereby are upon brackets which are capable of adjustment, it is also obvious that the distance between the upper strands can be varied, so that on the whole instead of making a fence containing ten strands, as shown in Fig. 2, one with a less number of strands can be made for an actual fence, if desired, by omitting the lower strands and spreading the upper ones. With a long or single sprocket-chain the difficulties of adjustment, so as to avoid the inherent difficulty of lost motion when the various distances between strands are adjusted as hereinbefore stated, become multiplied, whereas with my improved construction, permitting the use of two chains, these difficulties are nearly or quite eliminated.

The mechanical means which I have devised for the purpose of enabling the use of two chains is more particularly illustrated in Figs. 5, 6, 7, 8, and 9. It consists of supporting-brackets C C and C', attached to the framework A by the bolts $c$. These brackets are of the form shown in Fig. 7 and have an enlarged bearing $c^2$ (or a perforation which acts as a bearing) and is shown in section in Fig. 8. The sprocket and driving wheels are made up of two parts G H, the part G being a sprocket-wheel and the part H being a driving-wheel or spur-wheel, the two being firmly united by bolts or rivets $h\ h$ and having the cross-sections shown in Figs. 8 and 9. Each part G H has a projecting flange $C^4\ C^4$ upon its interior face, and they are united by the bolts $h\ h$ in such manner that the two flanges in uniting form a groove $h'$, thus forming a journal within the opening or bearing $c^2$ of the brackets C C. The portions of the compound wheel G H have a perforation $h^2$ therethrough, the extremities of the perforation being for the purpose of holding the wires which are to be twisted. The perforation is divided by two rollers J J, which extend across the central portion of the perforation and into recesses upon either side thereof, which thus form bearings for them, as shown at K K in Fig. 9. The inner faces of the rollers come in contact at their ends, the center portions at J' being of a smaller diameter. The rollers therefore become, when the wires are drawn through the perforations in the operation of twisting, friction-rollers, and as they rotate in opposite directions their contact at their extremities is an advantage as they roll one upon the other, the recesses K K merely serving to keep them in place, the tendency of the twisting of the wires always being to crowd the two rollers together. These wires are shown in connection with the rollers in Fig. 8 at W W. As already stated, the compound wheels G H have a spur-gearing on the wheel H, and this gearing meshes in the spur-gear of a pinion L. (Shown in Figs. 5 and 6.) This pinion is journaled upon a central shaft extending through a bearing L' in bracket C', and is also a compound wheel having a beveled gear upon its opposite face at M. This bevel-gear is driven by a bevel-pinion N, attached to a shaft journaled in a bracket N' and having upon its outer end means M' for the attachment of a crank $M^2$. The partial or complete rotation of the crank thereby rotates the compound wheels G H and through their sprocket portions operates the sprocket-chain, which correspondingly rotates the twisters above and below this driving-gear, as especially illustrated in Figs. 1 and 2 and as already described.

In the building of fence by means of these machines the wires are threaded through the twisters and carried from support to support, which may be some distance apart. As shown in Fig. 2, one of these supports is illustrated at P, and it consists of a framework, preferably of angle-bars P' P', carrying, adjustably attached thereto as to height, brackets Q Q, within which are journaled, as shown in Fig. 3, a peculiar form of tighteners, which are operated to strain the wires.

In this device R is the shaft within which the ends of two wires are threaded to make a strand. This shaft is turned until they are firmly engaged with it. One end of the shaft R carries a ratchet-wheel S, (shown more particularly in Fig. 4,) and located above the ratchet-wheel is a pawl T, which engages the ratchet-wheel S as it rotates in the direction of the arrow, the engagement being due to the action of gravity on the pawl T. A shaft R' is so formed as to permit the attachment of a wrench or crank, whereby the wires may be wound up on the shaft R until they are strained, the ratchet automatically preventing any release of the strain. At the opposite end of the shaft R is a collar $R^2$, which, with the ratchet S, forms the heads of a barrel and upon which the wire is wound, which prevents the wire from coming in contact with the fixed portions of the bracket and thus jamming. Each strand is thus drawn taut by a ratchet in the frame P, and the combined strands sustain the framework A, carrying the twister-wheels. In advance of the frame A are spreaders U U, which are grooved disks spreading the wires which constitute each strand.

The mode of operation of these devices will be readily understood from the description. It is sufficient to say that the whole of the framework A, with the twisters being supported upon the taut wires constituting the strands, becomes a loom for the weaving in of the pickets V V, and as fast as they are woven in by the reverse twisting of the wires constituting the strands the loom A is moved forward and another picket inserted into the angle formed by the spreading of the wires through the openings in the twister-wheels and is twisted in by a sufficient number of rotations of the crank $M^2$ in the manner already described. When the next picket is inserted, the twisting is reversed, and this operation is continued until the work in hand is finished.

What I claim is—

1. In a driving-gear for wire-fence machines, the combination of a supporting-frame; an intermediate gear consisting of a bevel gear-wheel and a spur-pinion; means for actuating the bevel-gear; adjacent twisters, each made in two portions, one portion being constructed with a spur-gear and adapted to mesh into said pinion, and the other portion being adapted to receive a sprocket-chain; and bearings for supporting the same; substantially as described.

2. In a driving-gear for fence-machines, the combination of a supporting-frame; a spur-pinion intermeshing into the gears of two twisters, each twister being composed of two portions, one portion being the spur-gear, and the other portion being a sprocket-wheel, and having an intermediate slot to receive strands of wire, each portion being formed with an annulus in such manner that when the annuli are brought together they form a bearing between the portions; and means for uniting the two portions of each twister; substantially as described.

In testimony whereof I sign this specification in the presence of two witnesses.

JOHN LANE.

Witnesses:
R. A. PARKER,
MARION A. REEVE.